US009596483B2

(12) United States Patent
Guo et al.

(10) Patent No.: US 9,596,483 B2
(45) Date of Patent: Mar. 14, 2017

(54) METHOD AND APPARATUS OF IMPROVED INTRA LUMA PREDICTION MODE CODING

(75) Inventors: Mei Guo, Harbin (CN); Xun Guo, Beijing (CN); Shaw-Min Lei, Hsin-chu (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 753 days.

(21) Appl. No.: 13/198,697

(22) Filed: Aug. 4, 2011

(65) Prior Publication Data

US 2012/0177113 A1   Jul. 12, 2012

Related U.S. Application Data

(60) Provisional application No. 61/430,701, filed on Jan. 7, 2011, provisional application No. 61/437,910, filed on Jan. 31, 2011.

(30) Foreign Application Priority Data

Jul. 5, 2011   (WO) ................ PCT/CN2011/076870

(51) Int. Cl.
   *H04N 19/593*  (2014.01)
   *H04N 19/159*  (2014.01)
   (Continued)

(52) U.S. Cl.
   CPC ......... *H04N 19/593* (2014.11); *H04N 19/159* (2014.11); *H04N 19/196* (2014.11); *H04N 19/463* (2014.11); *H04N 19/11* (2014.11)

(58) Field of Classification Search
   CPC combination set(s) only.
   See application file for complete search history.

(56) References Cited

U.S. PATENT DOCUMENTS

| 7,289,674 B2 * | 10/2007 | Karczewicz | ......... H04N 19/197 |
| | | | 375/E7.133 |
| 8,526,495 B2 * | 9/2013 | Liu | ...................... H04N 19/159 |
| | | | 375/240.12 |

(Continued)

FOREIGN PATENT DOCUMENTS

| CN | 101500161 | 8/2009 |
| CN | 101668202 | 3/2010 |

(Continued)

OTHER PUBLICATIONS

Jamil-Ur-Rehman; Zhang Ye; Kumarayapa, A., "Fast Intra Prediction Mode Decision by Adaptively Selecting Fewer Number of Modes," 2007 International Conference on Machine Learning and Cybernetics, vol. 4, pp. 2385,2389, Aug. 19-22, 2007.*

(Continued)

*Primary Examiner* — Dave Czekaj
*Assistant Examiner* — Tyler W Sullivan
(74) *Attorney, Agent, or Firm* — McClure, Qualey & Rodack, LLP (57) ABSTRACT

A method and apparatus for improved intra prediction mode coding are disclosed. Intra prediction exploits the spatial correlation within a picture or within a picture region. In High-Efficiency Video Coding (HEVC), a coding scheme for the intra luma prediction mode is considered, where the intra prediction mode of a current block is compared with the minimum of two intra luma prediction modes corresponding to two neighboring blocks. If the intra prediction mode of the current block is the same as the minimum of the two neighboring intra luma prediction modes, a single bit is transmitted to indicate the case. Otherwise, information for the current intra prediction mode is transmitted in fixed-length codeword. The present invention provides multiple intra prediction mode candidates based on neighboring intra (Continued)

prediction modes so that there is a better chance for predictor hit. Accordingly, improved coding efficiency is achieved.

12 Claims, 5 Drawing Sheets (51) Int. Cl.
*H04N 19/196* (2014.01)
*H04N 19/463* (2014.01)
*H04N 19/11* (2014.01)

(56) References Cited

U.S. PATENT DOCUMENTS

| | | | |
|---|---|---|---|
| 9,363,511 B2* | 6/2016 | Zhang | H04N 19/50 |
| 2004/0008771 A1* | 1/2004 | Karczewicz | H04N 19/197 375/240.03 |
| 2006/0104354 A1 | 5/2006 | Han et al. | |
| 2008/0013629 A1* | 1/2008 | Karczewicz | H04N 19/197 375/240.13 |
| 2008/0123947 A1* | 5/2008 | Moriya | H04N 19/105 382/166 |
| 2008/0175319 A1* | 7/2008 | Sun | H04N 19/197 375/240.12 |
| 2008/0267287 A1 | 10/2008 | Hannuksela | |
| 2009/0175334 A1* | 7/2009 | Ye | H04N 19/105 375/240.12 |
| 2011/0038414 A1 | 2/2011 | Song et al. | |
| 2011/0047155 A1 | 2/2011 | Sohn et al. | |
| 2011/0060599 A1 | 3/2011 | Kim et al. | |
| 2011/0243227 A1* | 10/2011 | Yoneji et al. | 375/240.12 |
| 2011/0286520 A1* | 11/2011 | Xu | H04N 19/176 375/240.12 |
| 2011/0292994 A1* | 12/2011 | Lim | H04N 19/182 375/240.02 |
| 2012/0082222 A1* | 4/2012 | Wang | H04N 19/176 375/240.12 |
| 2012/0082223 A1* | 4/2012 | Karczewicz | H04N 19/196 375/240.12 |
| 2012/0106636 A1* | 5/2012 | Kim | H04N 19/176 375/240.12 |
| 2012/0170652 A1* | 7/2012 | Guo | H04N 19/176 375/240.12 |
| 2012/0177118 A1* | 7/2012 | Karczewicz | H04N 19/137 375/240.13 |
| 2012/0314766 A1* | 12/2012 | Chien | H04N 19/176 375/240.12 |
| 2013/0266064 A1* | 10/2013 | Zhang | H04N 19/00569 375/240.12 |
| 2014/0126629 A1* | 5/2014 | Park | H04N 19/00042 375/240.02 |

FOREIGN PATENT DOCUMENTS

| | | |
|---|---|---|
| KR | 20060045314 | 5/2006 |
| WO | WO 2009/128653 | 10/2009 |
| WO | WO 2010/067529 | 6/2010 |
| WO | WO 2010067529 A1 * | 6/2010 |
| WO | WO 2010090749 A1 * | 8/2010 |

OTHER PUBLICATIONS

Jinho Lee; Jin Soo Choi; Jinwoo Hong; Haechul Choi, "Intra-mixture Prediction Mode and Enhanced Most Probable Mode Estimation for Intra Coding in H.264/AVC," Fifth International Joint Conference on INC, IMS and IDC, 2009. NCM '09., pp. 1619,1622, Aug. 25-27, 2009.*

Richardson, I.E.; "The H.264 Advanced Video Compression Standard, Second Edition;" 2010; pp. 137-177.

Wiegand, T., et al.; "WD1 Working Draft 1 of High-Efficiency Video Coding;" Joint Collaborative Team on Video coding (JCT-VC) OF ITU-T SG16 WP3 and ISO/IEC JTC1/SC29/WG11; Oct. 2010; pp. 1-137.

Guo, M., et al.; "Improved Intra Mode Coding;" Joint Collaborative Team on Video Coding (JCT-VC) of ITU-T SG16 WP3 and ISO/IEC JTC1/SC29/WG11; Jan. 2011; pp. 1-7.

* cited by examiner

Fig. 1

Prior Art

```
MostProbableModeFlag;
if (MostProbableModeFlag) {
   MostProbableModeIndex;
} else {
   RemPredMode;
}
```

*Fig. 5A*

```
IntraPredMode; //combined syntax
if ( IntraPredMode == MPM_CODEWORD ) {
   MostProbableModeIndex; //could be any codewords
}
```

*Fig. 5B*

```
IntraPredMode;
 if (IntraPredMode == CODEWORD_A) {
   ModeC = ModeA;
 } else if (IntraPredMode == CODEWORD_B) {
   ModeC = ModeB;
 } else { // IntraPredMode == CODEWORD_X
   ModeC = ModeX;
```

*Fig. 5C*

METHOD AND APPARATUS OF IMPROVED INTRA LUMA PREDICTION MODE CODING

CROSS REFERENCE TO RELATED APPLICATIONS

The present invention claims priority to U.S. Provisional Patent Application Ser. No. 61/430,701, filed Jan. 7, 2011, entitled "Improved Intra Prediction Mode Coding Method", U.S. Provisional Patent Application Ser. No. 61/437,910, filed Jan. 31, 2011, entitled "Improved Intra Prediction Mode Coding Method", and PCT Patent Application, Serial No. PCT/CN2011/076870, entitled "Method and Apparatus of Improved Intra Luma Prediction Mode Coding". The U.S. Provisional Patent Applications and the PCT Patent Application are hereby incorporated by reference in their entireties.

FIELD OF THE INVENTION

The present invention relates to video coding. In particular, the present invention relates to coding techniques associated with the intra luma prediction mode.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra mode coding is still required to process an initial picture or to periodically insert I-pictures (or Intra-coded picture, I-picture), and the I-pictures are inserted periodically to allow quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, multiple intra prediction modes are used to exploit spatial features and the number of intra prediction modes depends on the block size of a Prediction Unit (PU). For some PU block sizes (currently larger than 4×4), the number of intra luma prediction modes may be as many as 34. The intra luma prediction mode selected for each block has to be transmitted to the decoder side for proper decoding. The side information associated with the intra luma prediction mode may be substantial and therefore, it is desirable to develop schemes to improve the efficiency for coding intra luma prediction mode.

The intra luma prediction modes among neighboring blocks may be highly correlated. Therefore, the intra luma prediction modes from neighboring blocks that have been reconstructed may be used as a predictor for a current block. In HEVC, a coding scheme for the intra luma prediction mode is being considered, where the intra prediction mode of a current block is compared with the minimum of two intra luma prediction modes corresponding to two neighboring blocks. If the intra prediction mode of the current block is the same as the minimum of the two neighboring intra luma prediction modes, a single bit is transmitted to indicate the case. Otherwise, a single bit is transmitted along with information for the current intra prediction mode represented in fixed-length format. While the coding scheme for the intra luma prediction mode being considered may not fully exploit the correlations of the neighboring intra luma prediction modes, it is desirable to further improve the performance. Accordingly, a coding scheme that further exploits the dependency of the neighboring intra luma prediction mode is disclosed.

BRIEF SUMMARY OF THE INVENTION

A method and apparatus for coding intra prediction mode of a block are disclosed. In one embodiment according to the present invention, the method and apparatus for coding intra prediction mode of a block comprise steps of receiving a current intra prediction mode corresponding to a current block, receiving a first neighboring intra prediction mode corresponding to a first neighboring block and a second neighboring intra prediction mode corresponding to a second neighboring block, determining a first mode candidate and a second mode candidate based on the first neighboring intra prediction mode and the second neighboring intra prediction mode and providing coded representation of the current intra prediction mode. The first indication of the coded representation indicates whether the current intra prediction mode is equal to any of the first mode candidate and the second mode candidate, and if the current intra prediction mode is equal to any of the first mode candidate and the second mode candidate, the second indication of the coded representation further indicates which of the first mode candidate and the second mode candidate that is equal to the current intra prediction mode.

In another embodiment of the present invention, the first neighboring intra prediction mode is used as the first mode candidate and the second neighboring intra prediction mode is used as the second mode candidate. If any one of the neighboring intra prediction modes is not available, the corresponding mode candidate is set to DC mode or other mode. In yet another embodiment according to the present invention, the coded representation selects a first n-bit codeword if the current intra prediction mode is equal to the minimum of the first mode candidate and the second mode candidate, and otherwise the coded representation selects a second n-bit codeword if the current intra prediction mode is equal to maximum of the first mode candidate and the second mode candidate. Furthermore, the coded representation consists of another n-bit codeword followed by information associated with the current intra prediction mode when the current intra prediction mode is not equal to any of the first mode candidate and the second mode candidate. This n-bit codeword indicates a case that the current intra prediction mode is not equal to any of the first mode candidate and the second mode candidate. In one embodiment according to the present invention, different block sizes may have different intra prediction mode priority orders. In another embodiment according to the present invention, the plane mode or the planar mode may be used as an intra prediction mode. In yet another embodiment according to the present invention, the coded representation of the current intra prediction mode is based on a single or multiple coding tables. Furthermore, selection of the multiple coding tables is according to sizes of the first neighboring block and the second neighboring block or according to the first neighboring intra prediction mode and the second neighboring intra prediction mode.

A method and apparatus for decoding intra prediction mode of a block are disclosed. In one embodiment according to the present invention, the method and apparatus for decoding intra prediction mode of a block comprise steps of receiving a first neighboring intra prediction mode corresponding to a first neighboring block and a second neighboring intra prediction mode corresponding to a second neighboring block, determining a first mode candidate and a second mode candidate based on the first neighboring intra prediction mode and the second neighboring intra prediction mode, receiving coded representation corresponding to a current intra prediction mode of a current block, and providing the current intra prediction mode if the coded representation indicates that the current intra prediction mode is equal to one of the first mode candidate and the second mode candidate. The coded representation includes a first indication for whether the current intra prediction mode is equal to any of the first mode candidate and the second mode candidate, and if the current intra prediction mode is equal to any of the first mode candidate and the second mode candidate, the coded representation includes a second indication for which of the first mode candidate and the second mode candidate that is equal to the current intra prediction mode. The method for decoding intra prediction mode further comprises a step of providing the current intra prediction mode based on information associated with the current intra prediction mode when the first indication indicates that the current intra prediction mode is not equal to any of the first mode candidate and the second mode candidate, wherein the coded representation includes the information associated with the current intra prediction mode if the first indication indicates that the current intra prediction mode is not equal to any of the first mode candidate and the second mode candidate. In another embodiment according to the present invention, the first neighboring intra prediction mode is used as the first mode candidate and the second neighboring intra prediction mode is used as the second mode candidate. If the neighboring intra prediction mode is not available, the mode candidate is set to DC mode or other mode. In yet another embodiment according to the present invention, the coded representation selects a first n-bit codeword if the current intra prediction mode is equal to minimum of the first mode candidate and the second mode candidate, and otherwise the coded representation selects a second n-bit codeword if the current intra prediction mode is equal to maximum of the first mode candidate and the second mode candidate. Furthermore, when the current intra prediction mode is not equal to any of the first mode candidate and the second mode candidate, the coded representation consists of another n-bit codeword followed by information associated with the current intra prediction mode. This n-bit codeword is used to indicate a case that the current intra prediction mode is not equal to any of the first mode candidate and the second mode candidate.

In one embodiment according to the present invention, different block sizes are associated with different intra prediction mode priority orders, wherein the blocks refer to the first neighboring block, the second neighboring block and the current block. In another embodiment according to the present invention, the current intra prediction mode, the first neighboring intra prediction mode and the second neighboring intra prediction mode belong to a prediction mode set comprising a plane mode or a planar mode. The plane mode or the planar mode can be used for different block sizes, such as 64×64, 32×32, 16×16, 8×8, and 4×4. In yet another embodiment according to the present invention, the coded representation of the current intra prediction mode is based on a single or multiple coding tables. The selection of the multiple coding tables is according to sizes of the first neighboring block and the second neighboring block or according to the first neighboring intra prediction mode and the second neighboring intra prediction mode.

DETAILED DESCRIPTION OF THE INVENTION

Figure 1:
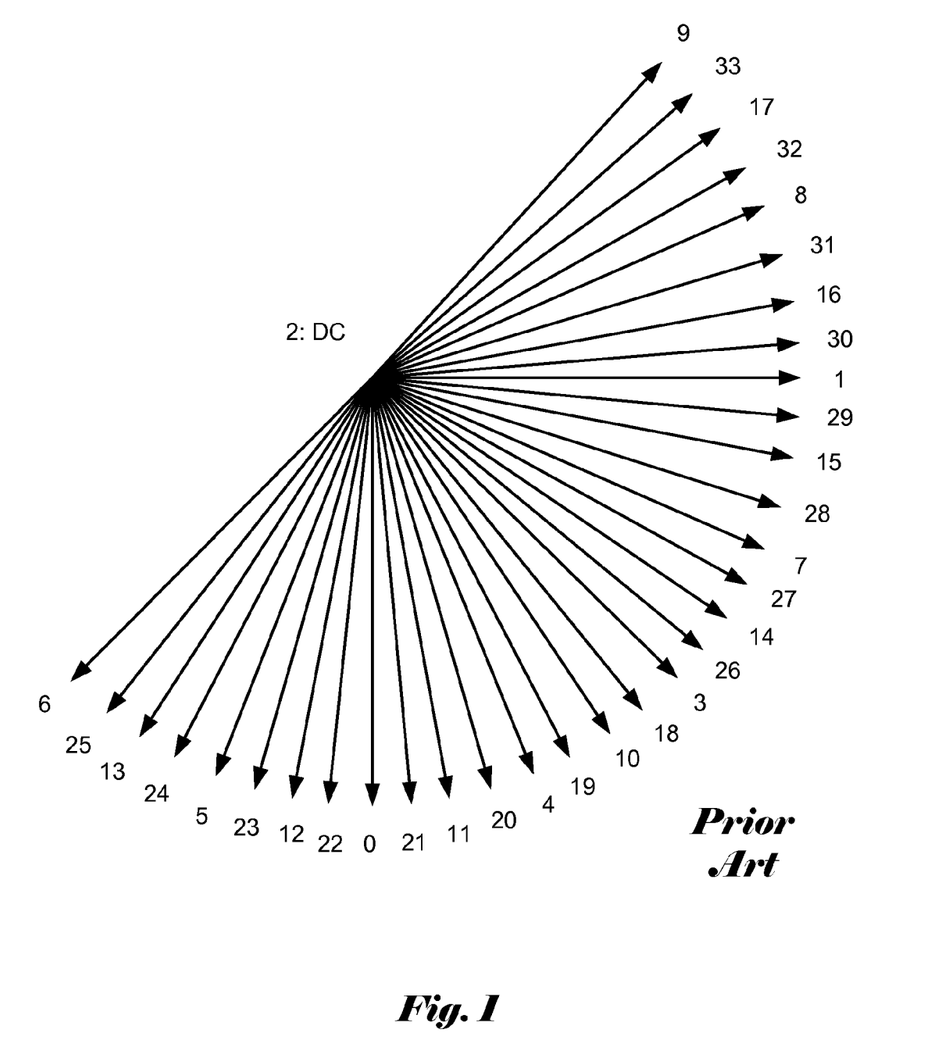
FIG. 1 illustrates the 34 intra luma prediction modes including various angular modes and a DC mode being considered for High-Efficiency Video Coding (HEVC).

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra coding is still required to process an intra picture (or I-picture), or intra blocks (or I-blocks) for quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, more intra prediction modes are used to exploit spatial features and the number of intra prediction modes depends on the block size of a Prediction Unit (PU). For example, HEVC being developed allows intra prediction of luma block (i.e., PU) at sizes of 64×64, 32×32, 16×16, 8×8, and 4×4. For each block size, multiple intra prediction modes are used as shown in Table 1. For block sizes 32×32, 16×16, and 8×8, there are 34 modes including 33 directional prediction modes and a DC mode as shown in FIG. 1. For block sizes 64×64 and 4×4, subsets of the 34 prediction modes are used. The set of available intra prediction modes for a given block size is called a prediction mode set in this disclosure. Accordingly, the prediction mode set for block sizes 32×32, 16×16, and 8×8 contains 34 intra prediction modes and the prediction mode set for block sizes 64×64 and 4×4 contains 3 and 17 intra prediction modes respectively.

TABLE 1

| Block size | Number of Luma Mode | Luma Modes |
| --- | --- | --- |
| 64 × 64 | 3 | 0~2 |
| 32 × 32 | 34 | 0~33 |
| 16 × 16 | 34 | 0~33 |
| 8 × 8 | 34 | 0~33 |
| 4 × 4 | 17 | 0~16 |

Figure 2:
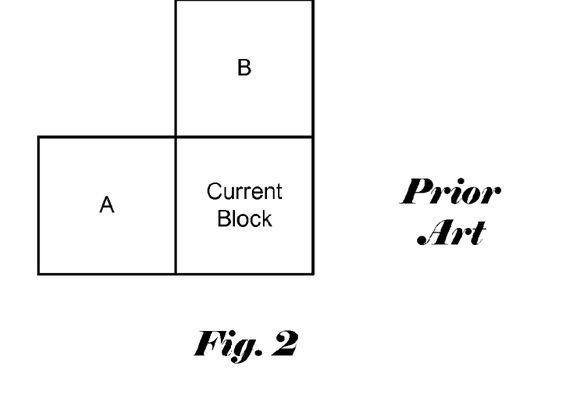
FIG. 2 illustrates an example of two neighboring blocks.
Figure 3:
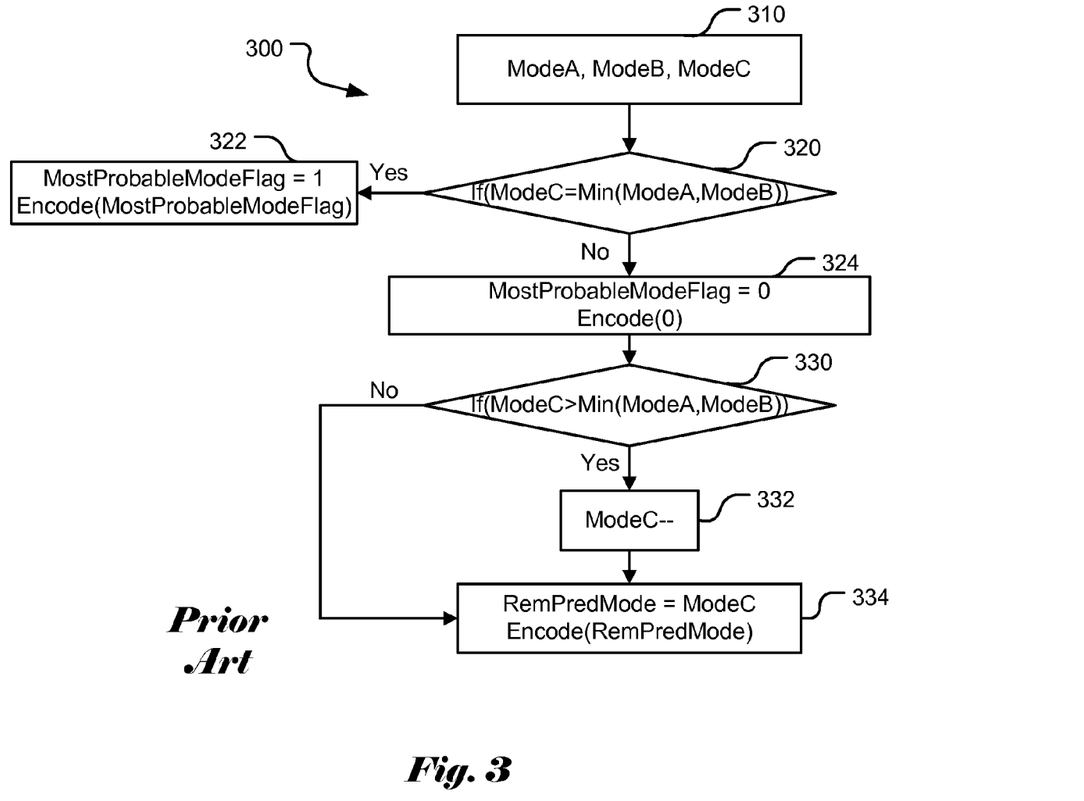
FIG. 3 illustrates a flow chart corresponding to coding the intra prediction mode according to a conventional approach.

The use of multiple intra prediction modes can improve quality of prediction by resulting in smaller intra prediction residues. However, the intra luma prediction mode selected for each block has to be transmitted to the decoder side for proper decoding. The side information associated with the intra luma prediction mode may be substantial. In HEVC, a coding scheme for the intra luma prediction mode is being considered, where the intra prediction mode of a current block is compared with the minimum of two neighboring intra luma prediction modes. The configuration of the two neighboring blocks is showing in FIG. 2, where block A is on the left side and block B is on the top side of the current block. ModeA and ModeB designate the intra luma prediction modes for block A and block B respectively. A flow chart 300 corresponding to the conventional scheme considered for HEVC is shown in FIG. 3. The intra prediction mode of the current block ModeC and two neighboring intra prediction modes ModeA and ModeB are received at step 310. According to the conventional scheme considered for HEVC, the intra mode predictor PredMode is first calculated based on predMode=Min(ModeA, ModeB) and PredMode is compared with ModeC in step 320. If the intra prediction mode of the current block ModeC is the same as the predMode (i.e., the "Yes" arrow), a 1-bit flag MostProbableModeFlag=1 is transmitted to indicate the case as shown in step 322. Otherwise (i.e., the "No" arrow), a 1-bit flag MostProbableModeFlag=0 is transmitted to indicate the case as shown in step 324 and the remainder mode RemPredMode for the current intra prediction mode ModeC is transmitted, where RemPredMode is the same as ModeC if ModeC<PredMode and, otherwise RemPredMode=ModeC−1. Accordingly, the test "If (ModeC>Min(ModeA, ModeB))" is performed in step 330. If the result is "Yes", ModeC is decremented by 1 as shown in step 332. Otherwise (i.e., the "No" arrow), RemPredMode=ModeC and the flow goes to step 334. The ModeC is then transmitted in step 334. For convenience, the case that ModeC is the same as the PredMode is called "predictor hit" and the case that ModeC is not the same as the PredMode is called "predictor miss" in this disclosure. RemPredMode is represented in fixed-length codewords. The neighboring intra luma prediction modes ModeA and ModeB may be invalid when the current block is at the left boundary or top boundary of the picture, or the neighboring blocks and the current block have different block sizes. For example, when the current block size is 4×4 or 64×64 and neighboring blocks have other sizes, ModeA and ModeB may be invalid for the current block. In this case, ModeA and ModeB will be mapped into valid modes first and then predMode is derived as the minimum of ModeA and ModeB.

Figure 4:
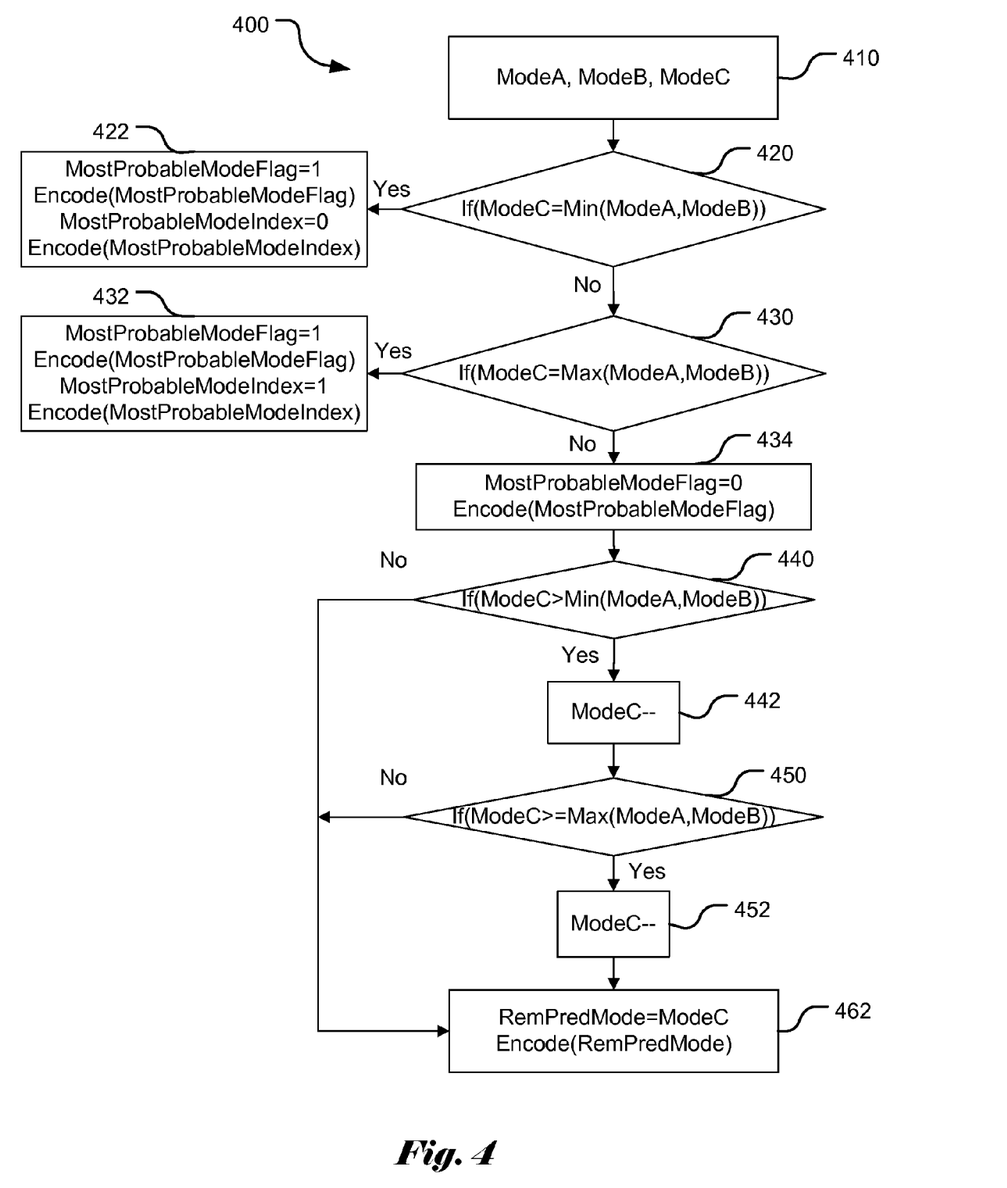
FIG. 4 illustrates an exemplary flow chart corresponding to coding intra prediction mode with two intra prediction mode candidates according to the present invention.

In the above predictive coding for intra luma prediction mode, the intra mode predictor PredMode is derived to provide a single candidate, i.e., Min(ModeA, ModeB). When the current intra prediction mode ModeC is equal to PredMode, only 1 bit, i.e., MostProbableModeFlag=1 is required to indicate this case. When the current intra prediction mode ModeC is not equal to PredMode, MostProbableModeFlag=0 and RemPredMode have to be transmitted, which will require more bits. Consequently, the cost in terms of side information is much higher for the case of predictor miss than that for the case of predictor hit. Therefore, an embodiment according to the present invention extends the intra mode predictor PredMode to include more than one candidate in order to improve the probability of ModeC being equal to PredMode, i.e., to improve the chance for predictor hit. Instead of providing a single intra prediction mode candidate as described in the conventional HEVC scheme, the present invention provides multiple intra prediction mode candidates based on neighboring intra prediction modes so that there is a better chance for predictor hit. When one of the neighboring mode candidates is not available, the mode candidate can be set to DC or one of other modes to improve the probability of providing a matched predictor. When one of the neighboring modes is not a candidate intra prediction mode of ModeC (e.g., a neighboring PU and the current PU have different PU sizes and different numbers of luma modes, as illustrated in Table 1), it is first mapped to a candidate intra prediction mode of ModeC. After these processes, if ModeA is equal to ModeB, the conventional scheme is used; otherwise, multiple intra prediction mode candidates based on neighboring intra prediction modes can be introduced to the intra mode coding of the current mode. An example to derive two intra prediction mode candidates based on two neighboring intra prediction modes is illustrated in the exemplary flow chart 400 as shown in FIG. 4. While the conventional scheme only uses Min(ModeA, ModeB) as the intra prediction mode candidate, the example in FIG. 4 also uses Max(ModeA, ModeB) as a second intra prediction mode candidate. The process starts with receiving ModeA, ModeB and ModeC in step 410. The test "If (ModeC=Min(ModeA, ModeB))" is performed in step 420. If the result is "Yes", coded representation, i.e., a codeword "1" and a codeword "0" are transmitted, as shown in step 422, to indicate the case. The codeword "1" corresponds to MostProbableModeFlag=1 and the codeword "0" indicates the selection of minimum of ModeA and ModeB. The selection bit is referred as MostProbableModeIndex in this disclosure. Otherwise the test "If (ModeC=Max(ModeA, ModeB))" is performed in step 430. If the result is "Yes", coded representation, i.e., a codeword "1" and a second codeword "1" are transmitted, as shown in step 432, to indicate the case. The first codeword "1" corresponds to MostProbableModeFlag=1 and the second codeword "1" indicates the selection of maximum of ModeA and ModeB. Otherwise (i.e., the "No" arrow), a codeword "0" is transmitted as shown in step 434 followed by transmitting information associated with ModeC. Similar to step 324 in FIG. 3, step 434 corresponds to the case of "MostProbableModeFlag=0". Also, similar to the conventional case, ModeC is decremented by 1 (step 442) if the test "If (ModeC>Min (ModeA,ModeB))" (step 440) is "Yes". Otherwise (i.e., the "No" arrow from step 440), ModeC is not decremented and RemPredMode is set to ModeC as shown in step 462. RemPredMode is then transmitted. In the example of FIG. 4, an additional test "If (ModeC>=Max (ModeA,ModeB))" (step 450) is performed after step 442. If the result is "Yes", ModeC is decremented by 1 (step 452). Otherwise (i.e., the "No" arrow from step 450), ModeC is not decremented and RemPredMode is set to ModeC as shown in step 462. It is noted that ModeC can be compared to the Max(ModeA, ModeB) first and then the Min (ModeA, ModeB). If the test "If (ModeC>Max(ModeA,ModeB))" is "Yes", ModeC is decremented by 1. No matter whether the test "If (ModeC>Max(ModeA,ModeB))" is "Yes" or "NO", the test "If (ModeC>=Min (ModeA,ModeB))" is performed. If the test—"If (ModeC>=Min (ModeA,ModeB))" is "Yes", ModeC is decremented by 1 another time. Finally, ModeC is transmitted as shown in step 462.

Figure 5A:
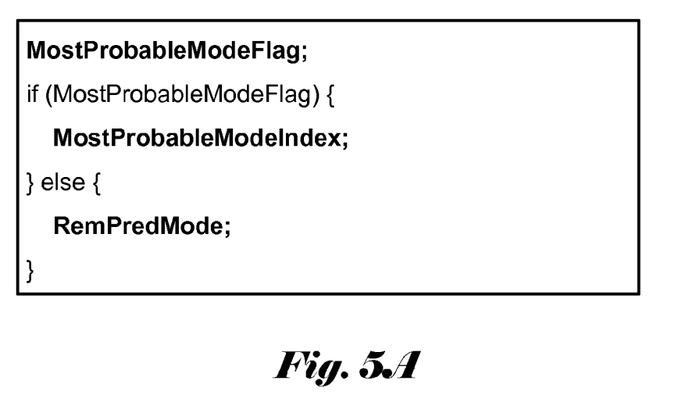
FIGS. 5A-C illustrate examples of syntax design to support intra prediction mode coding with two intra prediction mode candidates according to the present invention.
Figure 5B:
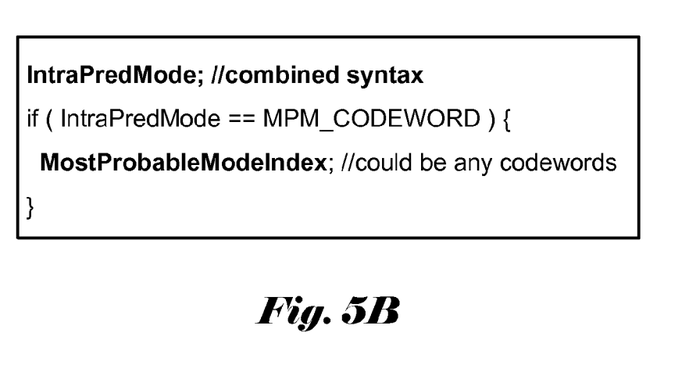
Figure 5C:
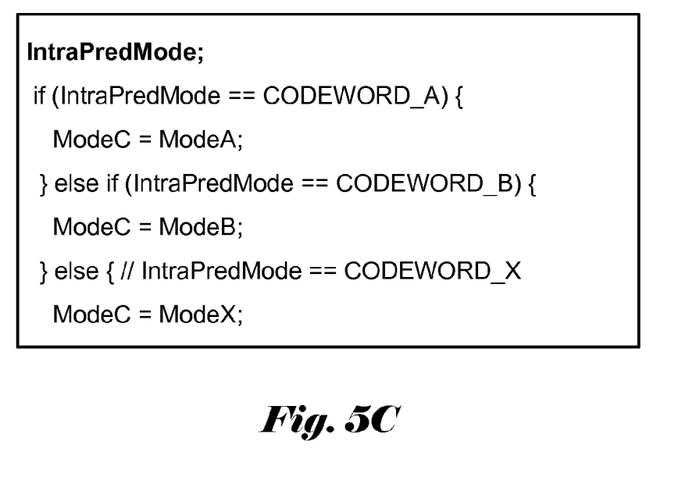

The flow chart of FIG. 4 illustrates one embodiment to provide more than one intra luma prediction mode candidates. A skilled person in the field may practice the present invention using various variations without departing from the spirit or essential characteristics of the present invention. For example, neighboring blocks from other spatial locations, more than two neighboring blocks, more than two intra luma prediction mode candidates, or other methods to derive the candidates can be used to practice the invention. The syntax to support the provisioning of multiple candidates may be designed in various formats. For example, FIG. 5A illustrates a syntax example similar to the conventional method where MostProbableModeFlag and RemPredMode are used. However, an additional bit, MostProbableModeIndex, is transmitted to indicate whether ModeA or ModeB is used. FIG. 5B illustrates another syntax design where combined syntax IntraPredMode is used. The codeword of IntraPredMode is selected depending on ModeC, ModeA and ModeB. A specific codeword MPM_CODEWORD is associated with the case that ModeC is equal to one of ModeA and ModeB. If IntraPredMode is the same as the codeword MPM_CODEWORD, MostProbableModeIndex is transmitted to indicate whether ModeA or ModeB is used. When IntraPredMode is not the same as the codeword MPM_CODEWORD which means the current prediction mode is not equal to either ModeA or ModeB, the codewords of IntraPredMode convey the information of the current intra luma prediction mode. FIG. 5C illustrates yet another syntax design. If IntraPredMode is the same as the codeword of ModeA, then ModeA is used as the mode for the current block. Otherwise, if IntraPredMode is the same as the codeword of ModeB, then ModeB is used as the mode for the current block. If neither case is satisfied, the information for the current mode is transmitted. The following tables (Tables 2 through 4) show the corresponding examples of the syntax definitions in PU level described by pseudo C language.

TABLE 2

Exemplary syntax definition for FIG. 5A

| | Descriptor |
|---|---|
| prediction_unit( x0, y0, log2PUWidth, log2PUHeight, PartIdx, InferredMergeFlag ) { | |
| if( skip_flag[ x0 ][ y0 ] ) { | |
| ... | |
| } else if( PredMode == MODE_INTRA ) { | |
|     prev_intra_luma_pred_flag[ x0 ][ y0 ] | u(1) \| ae(v) |
|     if( !prev_intra_luma_pred_flag[ x0 ][ y0 ] ) | |
|         If(NumMPMCand>1) | |
|             mpm_idx[ x0 ][ y0 ] | u(1) \| ae(v) |
|         else | |
|             rem_intra_luma_pred_mode[ x0 ][ y0 ] | ue(v) \| ae(v) |
| ... | |
| } | |
| ... | |

TABLE 3

Exemplary syntax definition for FIG. 5B

| | Descriptor |
|---|---|
| prediction_unit( x0, y0, log2PUWidth, log2PUHeight, PartIdx, InferredMergeFlag ) { | |
| if( skip_flag[ x0 ][ y0 ] ) { | |
| ... | |
| } else if( PredMode == MODE_INTRA ) { | |
|     intra_luma_pred_flag[ x0 ][ y0 ] | ue(v) \| ae(v) |
|     if( intra_luma_pred_flag[ x0 ][ y0 ] == MPM_CODEWORD) | |
|         If(NumMPMCand>1) | |
|             mpm_idx[ x0 ][ y0 ] | u(1) \| ae(v) |
|     ... | |
| } | |
| ... | |

TABLE 4

Exemplary syntax definition for FIG. 5C

| | Descriptor |
|---|---|
| prediction_unit( x0, y0, log2PUWidth, log2PUHeight, PartIdx, InferredMergeFlag ) { | |
| if( skip_flag[ x0 ][ y0 ] ) { | |
| ... | |
| } else if( PredMode == MODE_INTRA ) { | |
|     intra_luma_pred_flag[ x0 ][ y0 ] | ue(v) \| ae(v) |
|     ... | |
| } | |
| ... | |

In current HEVC, only one coding table is used for representing information associated with RemPredMode. An embodiment according to the present invention may use a single coding table or multiple coding tables to represent information associated with RemPredMode or IntraPredMode. In the case of multiple coding tables, the table selection can be based on the modes of neighboring blocks to avoid the need of side information. For example, in case of two coding tables used, the first table may be chosen if the neighboring modes are the same and the second table is chosen otherwise, as shown in examples of Table 5 and Table 6. Table 5 lists the codewords (as well as "depth", namely the length of each codeword) with 17 candidate intra modes for a specific PU size (e.g., 4×4), while Table 6 lists the codewords (as well as "depth", namely the length of each codeword) with 34 candidate intra modes for a specific PU size (e.g., 8×8, 16×16 and 32×32). In both Table 5 and Table 6, CodingTableOne is used when two neighboring modes are the same while CodingTableTwo is used when two neighboring modes are different. If ModeC is equal to either ModeA or ModeB, MPM_CODEWORD is transmitted followed by MostProbableModeIndex; otherwise, the codeword is selected according to the RemPredMode. Furthermore, the coding tables may also be selected according to different block (i.e., PU) sizes.

TABLE 5

Exemplary multiple tables with 17 candidate intra modes

| | | CodingTableOne | | CodingTableTwo | |
|---|---|---|---|---|---|
| | | Codeword | Depth | Codeword | Depth |
| MPM_CODEWORD | | 1 | 1 | 1 | 1 |
| RemPredMode | 0 | 7 | 4 | 0 | 4 |
| | 1 | 6 | 4 | 15 | 5 |
| | 2 | 11 | 5 | 14 | 5 |
| | 3 | 10 | 5 | 13 | 5 |
| | 4 | 9 | 5 | 12 | 5 |
| | 5 | 8 | 5 | 11 | 5 |
| | 6 | 7 | 5 | 10 | 5 |
| | 7 | 6 | 5 | 9 | 5 |
| | 8 | 5 | 5 | 8 | 5 |
| | 9 | 4 | 5 | 7 | 5 |
| | 10 | 3 | 5 | 6 | 5 |
| | 11 | 2 | 5 | 5 | 5 |
| | 12 | 3 | 6 | 4 | 5 |
| | 13 | 2 | 6 | 3 | 5 |
| | 14 | 1 | 6 | 2 | 5 |
| | 15 | 0 | 6 | Null | Null |

TABLE 6

Exemplary multiple tables with 34 candidate intra modes

|  |  | CodingTableOne | | CodingTableTwo | |
| --- | --- | --- | --- | --- | --- |
|  |  | Codeword | Depth | Codeword | Depth |
| MPM_CODEWORD |  | 1 | 1 | 1 | 1 |
| RemPredMode | 0 | 0 | 4 | 0 | 4 |
|  | 1 | 7 | 5 | 5 | 5 |
|  | 2 | 6 | 5 | 4 | 5 |
|  | 3 | 5 | 5 | 3 | 5 |
|  | 4 | 4 | 5 | 2 | 5 |
|  | 5 | 3 | 5 | 24 | 6 |
|  | 6 | 2 | 5 | 23 | 6 |
|  | 7 | 23 | 6 | 22 | 6 |
|  | 8 | 22 | 6 | 21 | 6 |
|  | 9 | 21 | 6 | 20 | 6 |
|  | 10 | 20 | 6 | 19 | 6 |
|  | 11 | 19 | 6 | 18 | 6 |
|  | 12 | 18 | 6 | 17 | 6 |
|  | 13 | 17 | 6 | 16 | 6 |
|  | 14 | 16 | 6 | 15 | 6 |
|  | 15 | 61 | 7 | 14 | 6 |
|  | 16 | 60 | 7 | 13 | 6 |
|  | 17 | 59 | 7 | 12 | 6 |
|  | 18 | 58 | 7 | 63 | 7 |
|  | 19 | 57 | 7 | 62 | 7 |
|  | 20 | 56 | 7 | 61 | 7 |
|  | 21 | 55 | 7 | 60 | 7 |
|  | 22 | 54 | 7 | 59 | 7 |
|  | 23 | 53 | 7 | 58 | 7 |
|  | 24 | 52 | 7 | 57 | 7 |
|  | 25 | 51 | 7 | 56 | 7 |
|  | 26 | 50 | 7 | 55 | 7 |
|  | 27 | 49 | 7 | 54 | 7 |
|  | 28 | 48 | 7 | 53 | 7 |
|  | 29 | 127 | 8 | 52 | 7 |
|  | 30 | 126 | 8 | 51 | 7 |
|  | 31 | 125 | 8 | 50 | 7 |
|  | 32 | 124 | 8 | Null | Null |

The plane or planar intra prediction mode has been used in H.264/AVC. However, this mode is not used in HEVC being considered. In order to improve the predictor performance, the plane or planar mode can also be included as a mode candidate in the prediction mode set. In the conventional HEVC system, a subset of intra luma prediction modes for block sizes 64×64 and 4×4 are derived from the 34 intra luma prediction modes for other block sizes. For example, currently there are 3 intra luma prediction modes corresponding to Vertical mode, Horizontal mode and DC mode are used for block size 64×64. Nevertheless, 3 different modes may be selected for 64×64 blocks and 17 different modes may be selected for 4×4 blocks.

The method of intra luma prediction mode coding for different block size can be different. One example of using a different coding method is to reorder the priority of possible modes. In a conventional scheme, the priority of prediction modes is always arranged according to the mode index. A smaller mode index always receives higher priority. The minimum of two neighboring luma prediction modes ModeA and ModeB is used as predMode. However, an embodiment according to the present invention allows re-ordering of the mode indices to improve performance. An example of mode index re-ordering is shown in Table 7, where 0 represents the highest priority. As shown in Table 7, for block sizes 16×16, 32×32 and 64×64, intra prediction mode 2 (i.e., DC mode) is assigned the highest priority while for block sizes 4×4 and 8×8, intra prediction mode 0 (i.e., Vertical mode) is assigned the highest priority. Also, intra prediction mode 34 (i.e., Plane or Planar mode) are assigned different priority in different block sizes as shown in Table 7. When the prediction mode for a PU with block size N×N is coded, predMode can be chosen to be ModeA or ModeB depending on which one possesses a higher priority. PredMode can be derived based on more neighboring blocks beyond the two neighboring blocks block A and block B.

TABLE 7

| Priority | 4 × 4 | 8 × 8 | 16 × 16 | 32 × 32 | 64 × 64 |
| --- | --- | --- | --- | --- | --- |
| 0 | 0 | 0 | 2(DC) | 2(DC) | 2(DC) |
| 1 | 1 | 1 | 0 | 34(Plane) | 34(Plane) |
| 2 | 2(DC) | 2(DC) | 1 | 0 | 0 |
| 3 | 3 | 34(Plane) | 34(Plane) | 1 | 1 |
| 4 | 4 | 3 | 3 | 3 | 9 |
| 5 | 5 | 4 | 4 | 4 | 3 |
| 6 | 6 | 5 | 5 | 5 | 4 |
| 7 | 7 | 6 | 6 | 6 | 5 |
| 8 | 8 | 7 | 7 | 7 | 6 |
| 9 | 9 | 8 | 8 | 8 | 7 |
| 10 | 34(Plane) | 9 | 9 | 9 | 8 |
| 11 | 10 | 10 | 10 | 10 | 10 |
| 12 | 11 | 11 | 11 | 11 | 11 |
| ... | ... | ... | ... | ... | ... |
| 33 | 32 | 32 | 32 | 32 | 32 |
| 34 | 33 | 33 | 33 | 33 | 33 |

The method of improved multiple intra prediction mode coding along with the syntax disclosed herein enables a decoder embodying the present invention to properly recover the current intra prediction mode from received bitstream corresponding to the compressed video. Since the derivation of mode predictor is based on neighboring blocks that have been processed and reconstructed, the decoder can derive the mode predictor accordingly. When one of the neighboring mode candidates is not available, the mode candidate can be set to DC or one of other modes to improve the probability of providing a matched predictor. When one of the neighboring modes is not a candidate intra prediction mode of ModeC (e.g., a neighboring PU and the current PU have different PU sizes and/or different numbers of luma modes, as illustrated in Table 1), it is first mapped to a candidate intra prediction mode of ModeC. After these processes, if ModeA is equal to ModeB, the conventional scheme is used; otherwise, the current intra mode is derived from multiple prediction mode candidates based on neighboring blocks. The bitstream contains information to indicate whether the current intra prediction mode is equal to any of the prediction mode candidates. If the information indicates that the current intra prediction mode is equal to one of the prediction mode candidates, the bitstream contains further information to indicate which of the prediction mode candidates is equal to the current prediction mode. In case that the information indicates that the current intra prediction mode is not equal to any of the prediction mode candidates, the bitstream will contain coded presentation for the current intra prediction mode for recovering the current intra prediction mode based on a coding table. Accordingly, the current intra prediction mode can be recovered at the decoder side properly.

Figure 6:
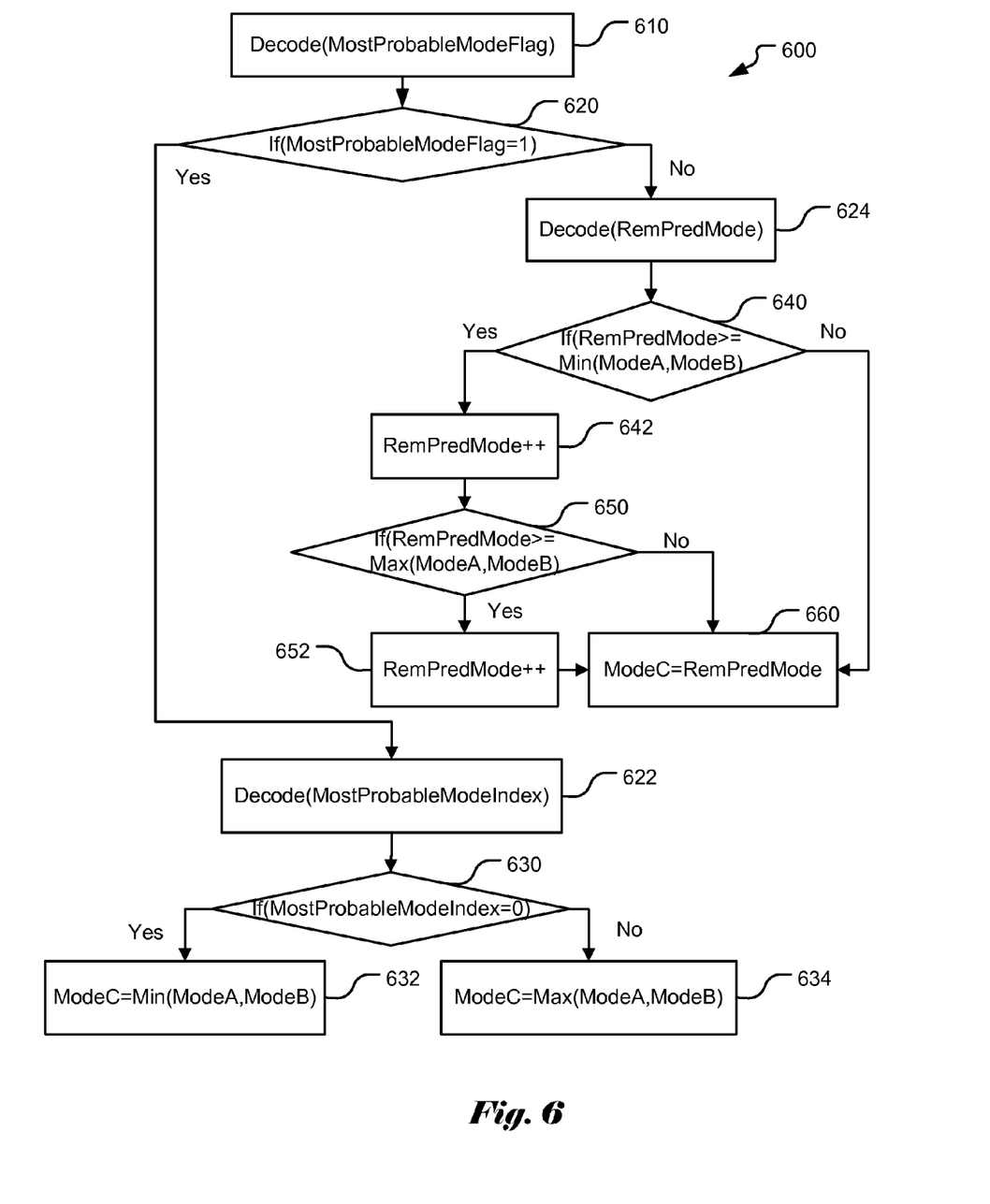
FIG. 6 illustrates an exemplary flow chart of decoding process according to one embodiment of the present invention.

An exemplary flow chart 600 for decoding process is illustrated in FIG. 6. The process starts with a decoded MostProbableModeFlag as shown in step 610. The test "If(MostProbableModeFlag=1)" is performed in step 620. If the result is "Yes", which means the current intra mode is equal to one of mode predictors based on neighboring blocks, the syntax element, MostProbableModeIndex, is decoded in step 622. Upon the decoding of MostProbableModeIndex in step 622, "If(MostProbableModeIndex=0)" is tested in step 630. If the result is "Yes", the current intra prediction mode is set according to ModeC=Min(ModeA, ModeB) as shown in step 632; otherwise (i.e., the "No" arrow from step 630), the current intra prediction mode is set according to ModeC=Max(ModeA,ModeB) as shown in step 634. However, if the result of test "If(MostProbableModeFlag=1)" in step 620 is "No", RemPredMode is decoded in step 624. And then, if the test "If(RemPredMode>=Min (ModeA,ModeB)" in step 640 is "Yes", RemPredMode is increased by 1 as shown in step 642. An additional test in step 650 "If(RemPredMode>=Max(ModeA,ModeB)" is performed. If the result of test in step 650 is "Yes", RemPredMode is increased by 1 as shown in step 652 and the flow goes to step 660. Finally, ModeC is equal to RemPredMode as shown in step 660. Either the result of test 640 or 650 is "No", ModeC is set to be equal to RemPredmode as shown in step 660.

Embodiment of video systems incorporating encoding or decoding of intra luma prediction mode according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of coding intra prediction mode of a block, the method comprising:
   receiving a current intra prediction mode corresponding to a current block;
   receiving a first neighboring intra prediction mode corresponding to a first neighboring block and a second neighboring intra prediction mode corresponding to a second neighboring block, wherein the first neighboring block and the second neighboring block are coded before the current block;
   determining a most probable mode (MPM) set by including the first neighboring intra prediction mode as a first most probable mode of said MPM set if the first neighboring intra prediction mode is available and further including the second neighboring intra prediction mode as a second most probable mode of said MPM set if the second neighboring intra prediction mode is available;
   providing a flag for the current intra prediction mode to indicate whether the current intra prediction mode belongs to said MPM set;
   if the flag indicates that the current intra prediction mode belongs to said MPM set, seeking a first predictor hit by using a first intra prediction mode candidate, the first intra prediction mode candidate characterized at least in part, by a minimum of the first neighboring intra prediction mode and the second neighboring intra prediction mode;
   if the first predictor hit is obtained, providing a first code word indicative of the current intra prediction mode being equal to the minimum of the first neighboring intra prediction mode and the second neighboring intra prediction mode;
   if the first predictor hit is not obtained, seeking a second predictor hit by using a second intra prediction mode candidate, the second intra prediction mode candidate characterized at least in part, by a maximum of the first neighboring intra prediction mode and the second neighboring intra prediction mode;
   if the second predictor hit is obtained, providing a second code word indicative of the current intra prediction mode being equal to the maximum of the first neighboring intra prediction mode and the second neighboring intra prediction mode;
   if the second predictor hit is not obtained, decrementing the current intra prediction mode a first time to provide a first decremented current intra prediction mode if the current intra prediction mode exceeds the minimum of the first neighboring intra prediction mode and the second neighboring intra prediction mode; and
   decrementing the current intra prediction mode a second time to provide a second decremented current intra prediction mode if the first decremented current intra prediction mode exceeds or is equal to the maximum of the first neighboring intra prediction mode and the second neighboring intra prediction mode.

2. The method of claim 1, wherein the first neighboring block is located on a left side of the current block and the second neighboring block is located on a top side of the current block.

3. The method of claim 1, wherein blocks of different sizes are associated with different intra prediction mode priority orders, wherein the blocks refer to the first neighboring block, the second neighboring block and the current block.

4. The method of claim 1, wherein the first code word is transmitted in prediction unit (PU) level.

5. The method of claim 1, further comprising:
   if the flag indicates that the current intra prediction mode does not belong to said MPM set, providing a third code word that is indicative of the current intra prediction mode not being equal to the maximum of the first neighboring intra prediction mode and the second neighboring intra prediction mode.

6. A method of decoding intra prediction mode of a block, the method comprising:
   receiving a first neighboring intra prediction mode corresponding to a first neighboring block and a second neighboring intra prediction mode corresponding to a second neighboring block of a current block;
   determining a most probable mode (MPM) set including the first neighboring intra prediction mode as a first most probable mode of said MPM set if the first neighboring intra prediction mode is available, including the second neighboring intra prediction mode as a second most probable mode of said MPM set if the second neighboring intra prediction mode is available;

receiving a flag for a current intra prediction mode of the current block indicating whether the current intra prediction mode belongs to said MPM set;

if the flag indicates that the current intra prediction mode belongs to said MPM set, detecting one of a first code word or a second code word, the first code word indicative of the current intra prediction mode being equal to a minimum of the first neighboring intra prediction mode and the second neighboring intra prediction mode, the second code word indicative of the current intra prediction mode being equal to a maximum of the first neighboring intra prediction mode and the second neighboring intra prediction mode;

if each of the first code word and the second code word is not detected, detecting a first decremented current intra prediction mode that is indicative of the current intra prediction mode exceeding the minimum of the first neighboring intra prediction mode and the second neighboring intra prediction mode; and if the first decremented current intra prediction mode is not detected, detecting a second decremented current intra prediction mode that is indicative of the current intra prediction mode exceeding or equaling the maximum of the first neighboring intra prediction mode and the second neighboring intra prediction mode.

7. The method of claim 6, wherein the first neighboring block is located on a left side of the current block and the second neighboring block is located on a top side of the current block.

8. The method of claim 6, wherein blocks of different sizes are associated with different intra prediction mode priority orders, wherein the blocks refer to the first neighboring block, the second neighboring block and the current block.

9. The method of claim 6, wherein the first code word is received in prediction unit (PU) level.

10. The method of claim 6, wherein the current intra prediction mode is increased by 1 if the current intra prediction mode is greater than the minimum of the first neighboring intra prediction mode and the second neighboring intra prediction mode, and the current intra prediction mode is further increased by 1 if the current intra prediction mode is equal to or greater than the maximum of the first neighboring intra prediction mode and the second neighboring intra prediction mode.

11. A method of coding intra prediction mode of a block, the method comprising:

receiving a current intra prediction mode corresponding to a current block;

receiving a first neighboring intra prediction mode corresponding to a first neighboring block and a second neighboring intra prediction mode corresponding to a second neighboring block, wherein the first neighboring block and the second neighboring block are coded before the current block;

determining availability of the first and second neighboring intra prediction modes;

determining a most probable mode (MPM) set, wherein determining said MPM set comprises:

including as a first most probable mode of said MPM set one of: the first neighboring intra prediction mode; and one of other modes based on availability of the first neighboring intra prediction mode;

including as a second most probable mode of said MPM set one of: the second neighboring intra prediction mode; and one of other modes based on availability of the second neighboring intra prediction mode; and responsive to said current intra prediction mode belonging to said MPM set, seeking a first predictor hit by using a first intra prediction mode candidate, the first intra prediction mode candidate characterized at least in part, by a minimum of the first neighboring intra prediction mode and the second neighboring intra prediction mode;

if the first predictor hit is obtained, providing a first code word indicative of the current intra prediction mode being equal to the minimum of the first neighboring intra prediction mode and the second neighboring intra prediction mode;

if the first predictor hit is not obtained, seeking a second predictor hit by using a second intra prediction mode candidate, the second intra prediction mode candidate characterized at least in part, by a maximum of the first neighboring intra prediction mode and the second neighboring intra prediction mode;

if the second predictor hit is obtained, providing a second code word indicative of the current intra prediction mode being equal to the maximum of the first neighboring intra prediction mode and the second neighboring intra prediction mode;

if the second predictor hit is not obtained, decrementing the current intra prediction mode a first time to provide a first decremented current intra prediction mode if the current intra prediction mode exceeds the minimum of the first neighboring intra prediction mode and the second neighboring intra prediction mode; and decrementing the current intra prediction mode a second time to provide a second decremented current intra prediction mode if the first decremented current intra prediction mode exceeds or is equal to the maximum of the first neighboring intra prediction mode and the second neighboring intra prediction mode.

12. The method of claim 11, further comprising transmitting the first code word in prediction unit (PU) level.

* * * * *